US012357522B2

(12) United States Patent
In et al.

(10) Patent No.: US 12,357,522 B2
(45) Date of Patent: Jul. 15, 2025

(54) SMART SLING FOR PATIENT TRANSFER ASSISTANCE

(71) Applicant: KOREA INSTITUTE OF SCIENCE AND TECHNOLOGY, Seoul (KR)

(72) Inventors: Hyunki In, Seoul (KR); Myungjoong Lee, Seoul (KR); Yonghwan Moon, Seoul (KR); Keri Kim, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 326 days.

(21) Appl. No.: 18/096,684

(22) Filed: Jan. 13, 2023

(65) Prior Publication Data

US 2023/0225921 A1 Jul. 20, 2023

(30) Foreign Application Priority Data

Jan. 17, 2022 (KR) ........................ 10-2022-0006616

(51) Int. Cl.
*A61G 7/16* (2006.01)
*A61G 7/10* (2006.01)

(52) U.S. Cl.
CPC ............ *A61G 7/16* (2013.01); *A61G 7/1046* (2013.01); *A61G 7/1051* (2013.01)

(58) Field of Classification Search
None
See application file for complete search history.

(56) References Cited

U.S. PATENT DOCUMENTS

| | | | | |
|---|---|---|---|---|
| 5,901,388 A * | 5/1999 | Cowan | A61G 7/1044 | 5/81.1 HS |
| 6,378,148 B1 * | 4/2002 | Votel | A61G 7/1044 | 5/81.1 R |
| 2012/0144581 A1 * | 6/2012 | Roberg | A61G 7/1026 | 5/81.1 C |
| 2017/0231846 A1 | 8/2017 | Farrington | | |
| 2018/0078438 A1 * | 3/2018 | Ferderber | A61G 1/01 | |
| 2019/0151176 A1 | 5/2019 | Zeigler | | |

FOREIGN PATENT DOCUMENTS

| | | |
|---|---|---|
| JP | 2001-212185 A | 8/2001 |
| JP | 6015970 B2 | 10/2016 |
| KR | 10-2020-0004847 A | 1/2020 |
| KR | 10-2355245 B1 | 1/2022 |

* cited by examiner

*Primary Examiner* — Adam C Ortiz
(74) *Attorney, Agent, or Firm* — NSIP Law

(57) ABSTRACT

A smart sling for patient transfer assistance includes a first driving unit, a second driving unit, a wire part and a sling unit. The first driving unit is configured to provide a rotational driving force. The second driving unit is spaced apart from the first driving unit by a predetermined distance. The wire part extends between the first driving unit and the second driving unit. The sling unit is configured to unfold toward the second driving unit from a folded state into the first driving unit along the wire part, to position a patient on the sling unit.

13 Claims, 10 Drawing Sheets

SMART SLING FOR PATIENT TRANSFER ASSISTANCE

This application claims priority under 35 U.S.C. § 119 to Korean Patent Application No. 10-2022-0006616, filed on Jan. 17, 2022, the disclosure of which is incorporated by reference herein in its entirety.

BACKGROUND

1. Field of Disclosure

The present disclosure of invention relates to a smart sling for patient transfer assistance, and more specifically the present disclosure of invention relates to a smart sling for patient transfer assistance capable of assisting bedridden or wheelchair-bound patients stably and efficiently, by applying a growth mechanism through mechanical drive.

2. Description of Related Technology

In nursing hospitals or facilities for various patients, assistive devices for transferring patients are used when transferring a bedridden patient from a bed to a wheelchair, toilet, bathtub, or the like, and vice versa.

In the conventional assistive devices for transferring patients, a structure using a sling is used in consideration of the safety and comfort of patients and the convenience of transfer work. However, in the above conventional devices, it takes a lot of labor and time to insert or remove the sling from the lower part of the patient, and thus its use in the actual field is limited.

For example, Korean laid-open patent application No. 10-2020-0004847 discloses a hoist structure lifting the patient through a support fixed to the ceiling, and the above technology is the representative conventional devices.

However, in the conventional hoist structure devices, it takes a lot of time and labor to position the patient with the actual hoist, and the ceiling structure for operating or moving the hoist also has to be designed in a complicated manner and takes up a lot of space.

Therefore, improvement of the riding assist device having such a complicated structure is required, and the demand for the riding assist device with improved usability and convenience is increasing.

SUMMARY

The present invention is developed to solve the above-mentioned problems of the related arts. The present invention provides a smart sling for patient transfer assistance capable of assisting bedridden or wheelchair-bound patients stably and efficiently, by applying a growth mechanism through mechanical drive.

According to an example embodiment, a smart sling includes a first driving unit, a second driving unit, a wire part and a sling unit. The first driving unit is configured to provide a rotational driving force. The second driving unit is spaced apart from the first driving unit by a predetermined distance. The wire part extends between the first driving unit and the second driving unit. The sling unit is configured to unfold toward the second driving unit from a folded state into the first driving unit along the wire part, to position a patient on the sling unit.

In an example, the first driving unit may include a first driving motor configured to provide the rotational driving force, a first case configured to cover an outside of the first driving motor, and a first entry and exit part extending to a side of the first case, to form a first opening portion.

In an example, the sling unit may exit through the first entry and exit part, and move toward the second driving unit.

In an example, the second driving unit may include a second driving motor configured to provide the rotational driving force, a second case configured to cover an outside of the second driving motor, and a second opening portion formed thorough the second case. Here, the wire part connected to the second driving motor may pass through the second opening portion.

In an example, the sling unit may include a fixing shaft configured to rotate at a fixed position, a sling part being wound on an outside of the fixing shaft, a guide frame disposed adjacent to the fixing shaft, to guide an extending direction of the sling part, a first moving shaft configured to spreading the sling part away from the fixing shaft, and a second moving shaft disposed adjacent to the first moving shaft.

In an example, the sling part may include a first surface connected between the fixing shaft and the first moving shaft, a second surface connected between the first moving shaft and the guide frame, a third surface connected between the second moving shaft and the guide frame, and a fourth surface connected between the fixing shaft and the second moving shaft.

In an example, when the sling unit is unfolded, the first surface and the fourth surface may be released from the fixing shaft and a length of the sling unit may increase, as the first moving shaft and the second moving shaft move away from the fixing shaft.

In an example, the sling unit further may further include a switching shaft disposed adjacent to the second moving shaft. Here, a position of the switching shaft may be changed so as to rotate with respect to the second moving shaft and the sling part may do not wind along an outer surface of the switching shaft.

In an example, when the smart sling is equipped to a wheelchair, the first driving unit may be disposed at a lower portion of the wheelchair, the second driving unit may be disposed at an upper portion of the wheelchair, and the sling unit may extend along a saddle and a backrest of the wheelchair from the first driving unit, to be unfold toward the second driving unit.

In an example, the smart sling may further include a supporting unit configured to guide the unfold state of a sling part of the sling unit. A first end of the supporting unit may be fixed to the second driving unit, and a second end of the supporting unit may be fixed to the saddle and the backrest.

In an example, the supporting unit may include an upper unit fixed to the second driving unit, an extending unit combined with the upper unit, and extending from the second driving unit toward a lower portion along the backrest, and a lower unit connected to a lower portion of the extending unit, to be fixed to the saddle.

In an example, the supporting unit may be a pair and may further include a guide shaft. Both ends of the guide shaft may be connected to the lower portions of a pair of the extending units, and the guide shaft may extend parallel with the saddle to guide an extending direction of the sling part.

In an example, a predetermined gap may be formed between a lower end of the extending unit and a lower portion of the lower unit.

In an example, the smart sling may further include an air tube disposed on the saddle and inflated by receiving pneumatic pressure from outside.

According to the present example embodiments, in lifting or moving the patient, it is possible to assist the patient in transferring while maintaining the patient's lying position or sitting position in the wheelchair, and thus the time and effort in the transfer process may be decreased and the patient convenience may be increased.

Here, the expanding of the sling part is performed with, so called, a growth mechanism, and thus the stable mechanical actuation enables effective insertion into gaps between the patient and the bed or between the patient and the wheelchair.

In addition, in expanding the sling part, the position or the posture may be changed among the shafts, and thus excessive force applied to the shaft may be minimized in applying the sling part to the wheelchair.

Further, an additional supporting unit may be applied to assist the transfer even while sitting in the wheelchair, and the position of the sling part in the bent part between the saddle and the backrest may be effectively changed through the supporting unit, so that stable automation operation may be performed.

In addition, the air tube is applied to increase convenience of the patient.

Figure 1A:
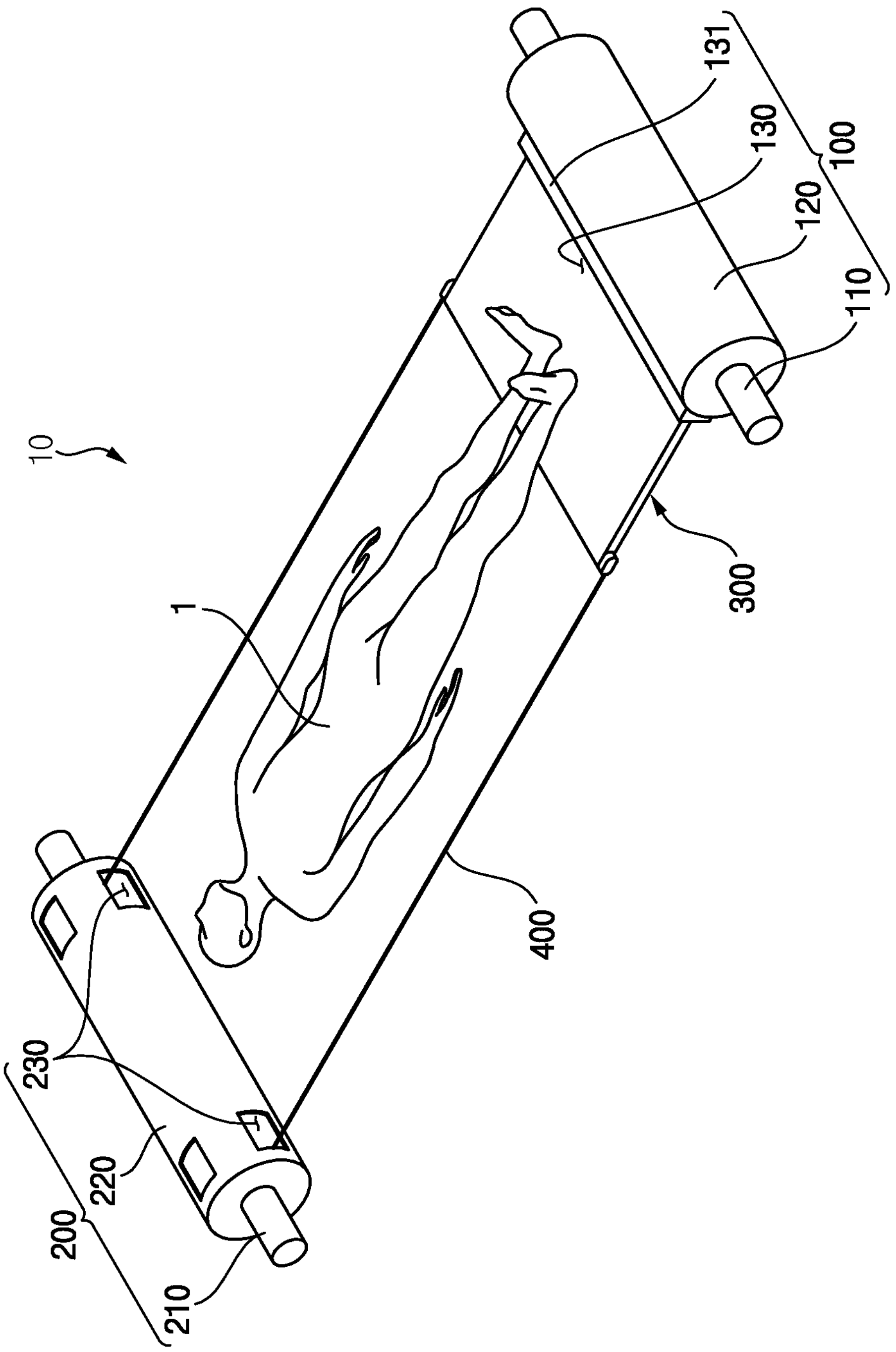
FIG. 1A and FIG. 1B are perspective views illustrating a smart sling according to the present example embodiment of the present invention.

| * Reference numerals | |
| --- | --- |
| 10: smart sling | 20: wheelchair |
| 100: first driving unit | 200: second driving unit |
| 300: sling unit | 400: wire part |
| 500: supporting unit | 600: air tube |

DETAILED DESCRIPTION

The invention is described more fully hereinafter with Reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the invention is described more fully hereinafter with reference to the accompanying drawings, in which embodiments of the invention are shown.

Figure 1B:
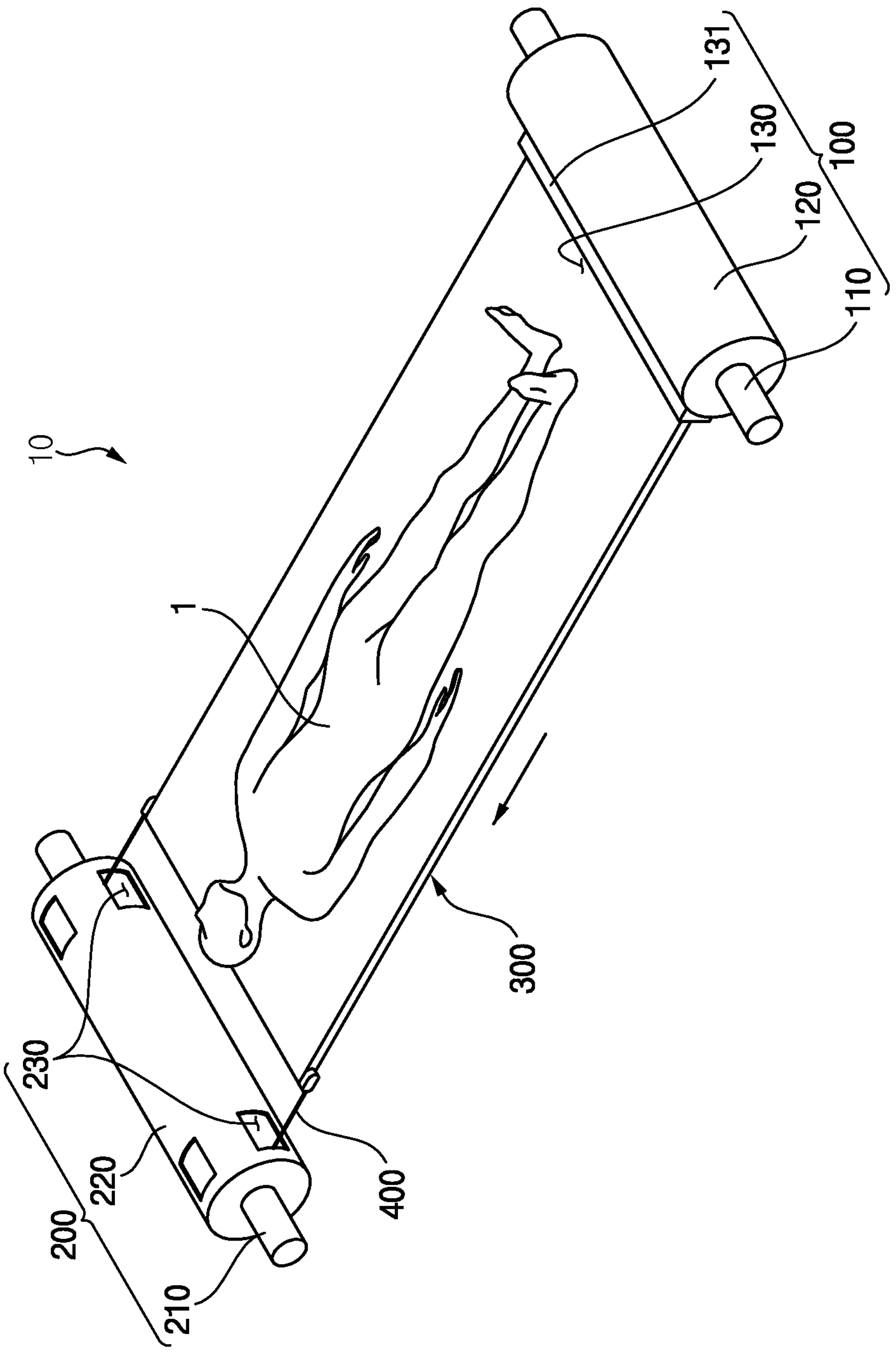

FIG. 1A and FIG. 1B are perspective views illustrating a smart sling according to the present example embodiment of the present invention.

Referring to FIG. 1A and FIG. 1B, the smart sling 10 according to the present example embodiment includes a first driving unit 100, a second driving unit 200, a sling unit 300 and a wire part 400.

The smart sling 10, for example, as illustrated in the figure, is a transfer assist device used for transferring the patient lying on bed. Thus, the patient 1 is positioned between the first and second driving units 100 and 200. Then, the smart sling 10 automatically operates to implement a state in which the patient 1 can be transferred, and then the patient 1 is transferred.

Here, the first driving unit 100 may be disposed at a first side of the patient 1, for example under the patient's feet. The first driving unit 100 includes a first driving motor 110, a first case 120 and a first entry and exit part 130.

The first driving motor 110 provides a rotational driving force to the sling unit 300, and the first case 120 covers an outside of the first driving motor 110.

Here, the first entry and exit part 130 is formed at a side of the first case 120, and thus the sling unit 300 exits or enters through a first opening portion 131 formed through the first entry and exit part 130.

Likewise, the second driving unit 200 may be disposed at a second side of the patient 1, for example over the patient's head. The second driving unit 200 includes a second driving motor 210, a second case 220 and a second opening portion 230.

The second driving motor 210 provides a rotational driving force and thus provides a pulling force to the wire part 400, and the second case 220 covers an outside of the second driving motor 210.

Here, the second opening portion 230 is formed through the second case 200, and the wire part 400 is connected to the second driving motor 210 through the second opening portion 230. Thus, a predetermined pulling force is provided to the wire part 400, due to the rotational driving force of the second driving motor 210.

Since a pair of the wire parts 400 are formed to extend along both side of the patient 1, that is, along the outside of the left arm and the outside of the right arm, the pair of the second opening portions 230 may be formed considering the arrangement of the wire part 400.

Further, a plurality of the second opening portions 230 may be arranged along an outer surface of the second case 200, and thus the wire part 400 may be connected to the second driving motor 210 inside of the second case 200 more easily even though the second case 200 is variously positioned.

The sling unit 300, as illustrated in FIG. 1A, is located in a wound state on the side of the first driving unit 100 at the initial state, and then as illustrated in FIG. 1B, the sling unit 300 unfolds in a direction toward the second driving unit 200 for transferring the patient 1.

Thus, the patient 1 is disposed on the sling unit 300, and the further transfer for the patient 1 may be performed. The sling unit 300 is transferred from the first driving unit 100 toward the second driving unit 200, and as this state of transfer, the sling unit 300 extends through the gap between the lying patient and the bed.

Here, the sling unit 300 receives the driving force through the wire part 400 connected to both side ends of the sling unit 300, and then the sling unit 300 moves toward the second driving unit 200. Further specific structures and driving state of the sling unit 300 will be explained below.

The wire part 400 extends between the first driving motor 110 of the first driving unit 100 and the second driving motor 210 of the second driving unit 200, and both side ends of the sling unit 300 are fixed to the wire part 400.

Thus, when the sling unit 300 unfolds, the wire part 400 moves from the first driving motor 110 toward the second driving motor 210. In contrast, when the sling unit is folded again, the wire part 400 moves from the second driving motor 210 toward the first driving motor 110.

According to the smart sling 10 explained above, the smart sling 10 does not make contact with a body of the patient 1, and the first and second driving units 100 and 200 and the wire part 400 are positioned not to make contact with the body of the patient 1 too, with the patient 1 lying down. In addition, the sling unit 300 simply unfolds to extend along the gap between the patient and the bed, and thus additional effort to position the patient 1 in a transferring state is unnecessary and the convenience of the patient 1 may be improved.

Figure 2A:
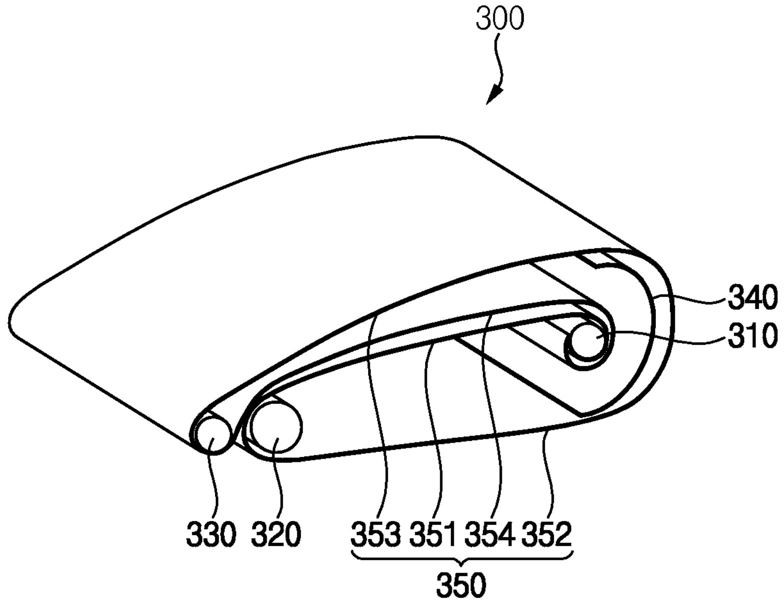
FIG. 2A and FIG. 2B are perspective views illustrating performance of a growth mechanism, as an operation of the smart sling of FIG. 1A.
Figure 2B:
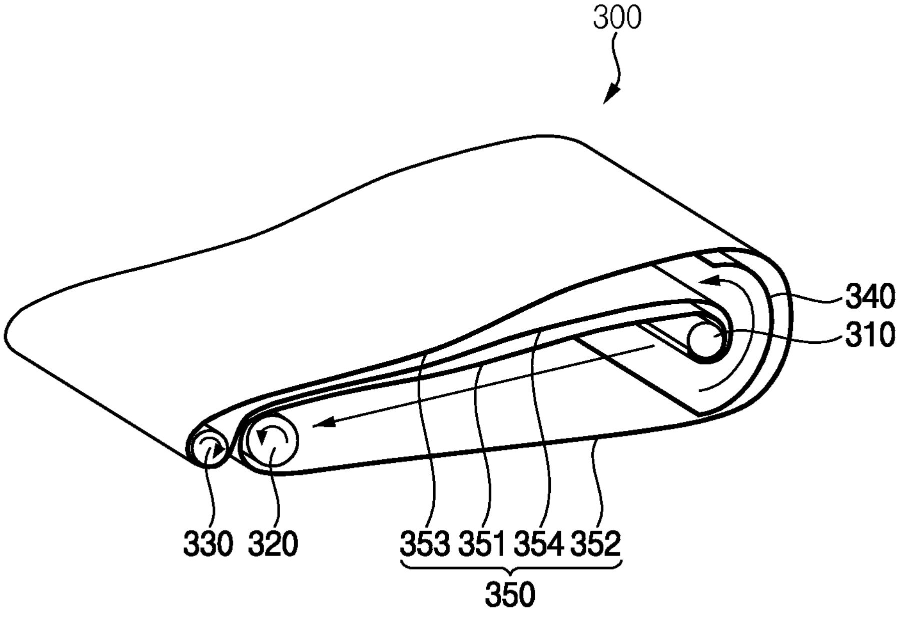

FIG. 2A and FIG. 2B are perspective views illustrating performance of a growth mechanism, as an operation of the smart sling of FIG. 1A.

First, referring to FIG. 2A, the sling unit 300 includes a fixing shaft 310, a first moving shaft 320, a second moving shaft 330, a guide frame 340 and a sling part 350.

The sling unit 300 illustrated as a single surface shape in FIG. 1A and FIG. 1B may include the sling part 350 having a plurality of overlapped surfaces. In addition, at a portion at which the wire part 400 and the sling unit 300 are connected, the first and second moving shafts 320 and 330 are disposed inside of the sling parts 350.

Further, the fixing shaft 310 is a shaft rotating at a fixed position, and the fixing shaft 310 rotates by receiving the rotational driving force of the first driving motor 110. Here, the fixing shaft 310 may be the same axis as the rotational axis of the first driving motor 110.

In addition, the guide frame 340 is spaced apart from an outer surface of the fixing shaft 310 by a constant distance. The guide frame 340 may have a curved shape frame structure like a partial outer surface of a cylinder.

Here, the guide frame 340 guides the unfolding direction of the sling part 350 when the sling part 350 unfolds or is folded.

The first moving shaft 320 moves toward or away from the fixing shaft 310, and rotational drive of the first moving shaft 320 is induced according to the movement of the sling part 350 wound on the outer surface of the first moving shaft 320.

The second moving shaft 330 is disposed adjacent to the first moving shaft 320, and likewise, the second moving shaft 330 moves toward or away from the fixing shaft 310 and rotational drive of the second moving shaft 330 is induced according to the movement of the sling part 350 wound on the outer surface of the second moving shaft 330.

Here, the rotational direction of the first moving shaft 320 and the rotational direction of the second moving shaft 330 may be opposite to each other, due to the winding direction of the sling part 350.

The sling part 350 directly contacts the body of the patient 1 and may include a fiber material such as cloth or cotton having a predetermined strength directly used for the transfer of the patient 1. Here, the material of the sling part 350 may be not limited thereto.

The sling part 350 includes a first surface 351, a second surface 352, a third surface 353 and a fourth surface 354. The first surface 351 extends between the fixing shaft 310 and the first moving shaft 320, the second surface 352 extends between the first moving shaft 320 and the guide frame 340, the third surface 353 extends between the guide frame 340 and the second moving shaft 330, and the fourth surface 354 extends between the second moving shaft 330 and the fixing shaft 310.

Here, the first to fourth surfaces 351, 352, 353 and 354 are not formed separately, and continuously extend from each other to form one unified sling part 350. Thus, for convenience of explanation, the first to fourth surfaces are merely expressed by different elements.

In the present example embodiment, the sling unit 300 is grown by a so-called growth mechanism and is unfolded or folded, and further explanation will be followed.

At the initial folding state of the sling unit 300, as illustrated in FIG. 1A and FIG. 2A, the first moving shaft 320 and the fixing shaft 310 are located relatively close to each other.

However, as the sling unit 300 is unfolded, as illustrated in FIG. 1B and FIG. 2B, the first and second moving shafts 320 and 330 are away from the fixing shaft 310 at the same time, and thus the sling part 350 is unfolded.

As the first moving shaft 320 is away from the fixing shaft 310, the fixing shaft 310 rotates along a counterclockwise direction as illustrated in an arrow and the first moving shaft 320 rotates along the counterclockwise direction too, so that a length of the first surface 351 increases. As the sling part wound in the fixing shaft 310 is unfolded, the length of the first surface 351 increases.

Here, as the second moving shaft 330 is also away from the fixing shaft 310 at the same time, the sling part wound in the fixing shaft 310 is unfolded along the movement of the second moving shaft 330. Thus, a length of the fourth surface 354 increases too. Here, the second moving shaft 330 rotates along a clockwise direction.

Accordingly, as the first and second moving shafts 320 and 330 are away from the fixing shaft 310 at the same time, the first surface 351 and the fourth surface 354 are unfolded from the fixing shaft 310 and then the length increases. Thus, overall, the sling part 350 is unfolded.

As the first and second moving shafts 320 and 330 move, the first and fourth surfaces 351 and 354 are unfolded from the fixing shaft 310 at the same time and the length increases, but relatively, the second surface 352 and the third surface 353 simply increase in length and maintain the same position as the initial state.

The length of each of the second surface 352 and the third surface 353 increases due to each of the sling part moved along the outer surface of the first moving shaft 320 and the sling part moved along the outer surface of the second moving shaft 330, but the second and third surfaces 352 and 353 maintain a so-called static state which does not move in either direction.

Thus, by simply driving the first and second moving shafts 320 and 330 to move in the direction of the second driving unit 200, the sling part 350 expands while increasing the area of the sling part 350, and accordingly, as illustrated in FIG. 1B, the patient transfer state may be implemented.

After the patient's transfer is finished, the state in which the sling part 350 is folded is implemented through the driving opposite to the driving explained above, and thus, any repetitive explanation will be omitted.

Figure 3A:
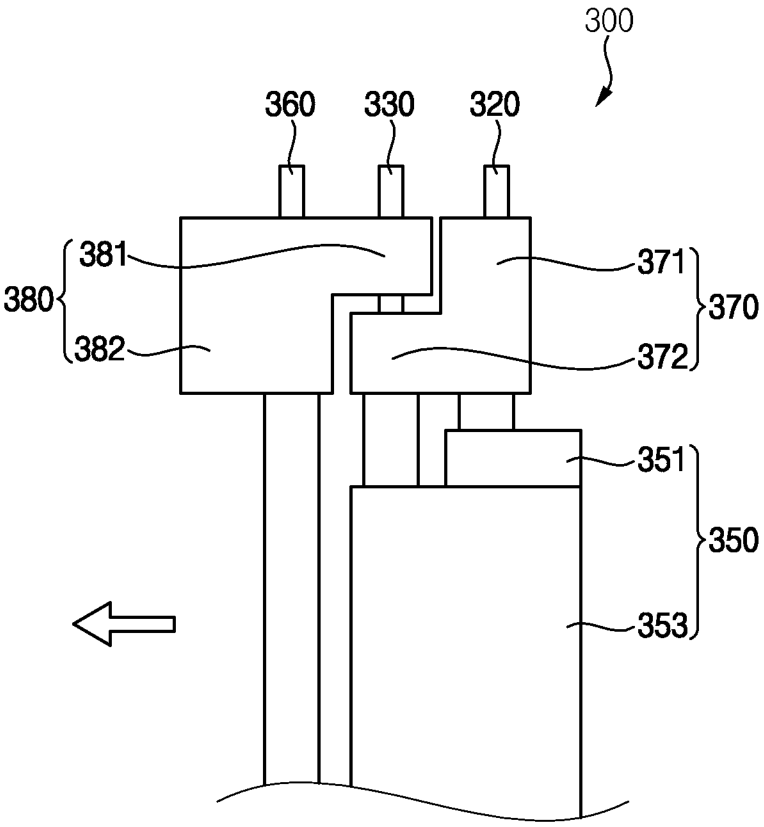
FIG. 3A is a partial plan view illustrating a sling unit of FIG. 2A, and FIG. 3B and FIG. 3C are partial perspective view illustrating operations of the sling unit of FIG. 3A.
Figure 3B:
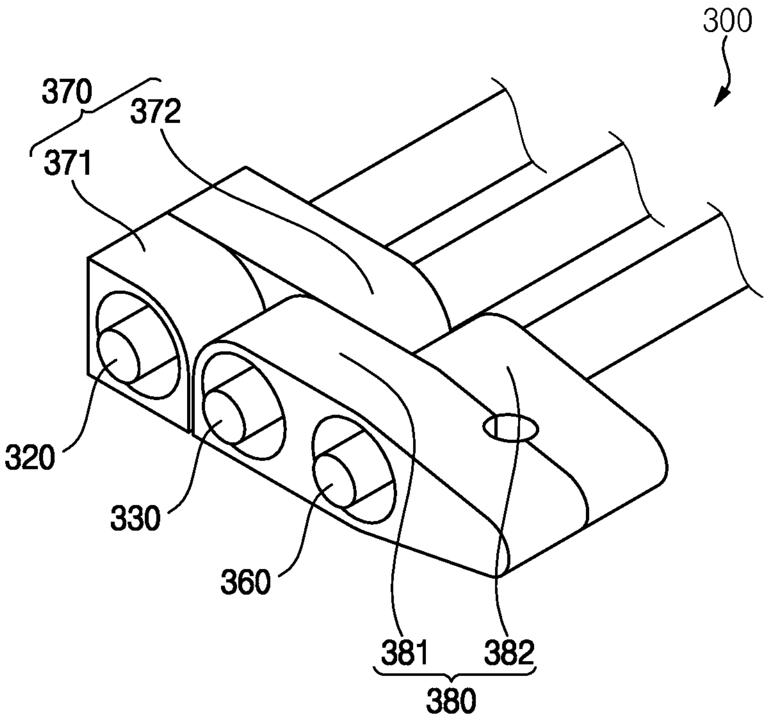
Figure 3C:
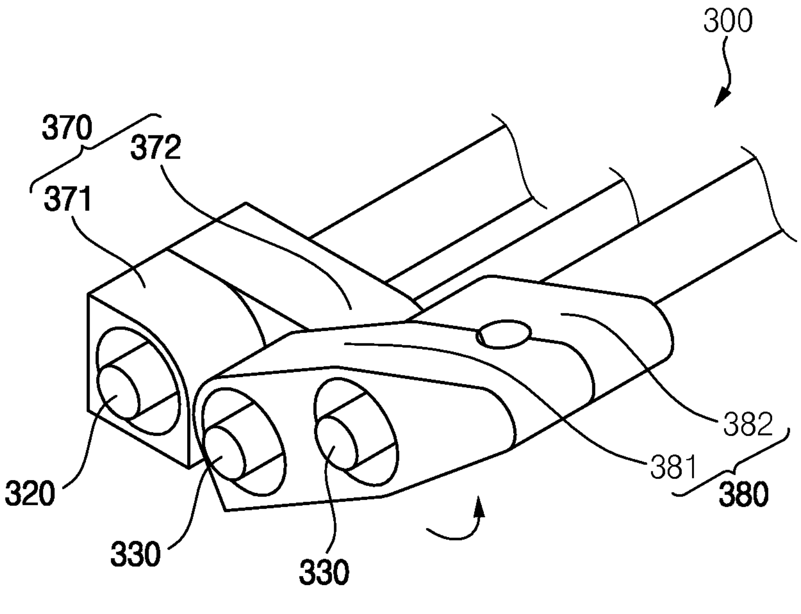

FIG. 3A is a partial plan view illustrating a sling unit of FIG. 2A, and FIG. 3B and FIG. 3C are partial perspective view illustrating operations of the sling unit of FIG. 3A.

Referring to FIG. 3A, the sling unit 300 further includes a switching shaft 360, a first connecting unit 370 and a second connecting unit 380.

In the sling unit 300 explained referring to FIG. 2A and FIG. 2B, the first and second moving shafts 320 and 330 are only included, but in addition to extending the sling unit 300 to be unfolded in a direction, the unfolding direction may be switched as needed.

Thus, the switching shaft 360 is further included and the switching shaft 360 is connected to be rotatable by a predetermined range with respect to the second moving shaft 330, so that the unfolding direction may be changed.

First, referring to FIG. 3A and FIG. 3B, the first connecting unit 370 includes a first connecting portion 371 fixed to the first moving shaft 320, and a first extending portion 372 extending from the first connecting portion 371 and fixed to both of the first moving shaft 320 and the second moving shaft 330 at the same time.

Thus, the first and second moving shafts 320 and 330 are integrally connected, and as explained above, the first and second moving shafts 320 and 330 move together along the wire part 400. Here, the sling part 350 is connected to the first and second moving shafts 320 and 330 in a wound state, as explained above.

The second connecting unit 380 includes a second connecting portion 381 and a second extending portion 382. The second connecting portion 381 is fixed to the second moving shaft 330. The second extending portion 382 extends from the second connecting portion 381 and is fixed to the second moving shaft 330 and the switching shaft 360 at the same time.

Here, the second connecting portion 381 is connected to be relatively rotatable with respect to the second moving shaft 330, and thus, the second connecting unit 380 and the switching shaft 360 may be rotated relative to the second moving shaft 330, as shown in FIG. 3C.

Then, the switching shaft 360 may be positioned so that its direction is changed while being rotated by a predetermined angle with respect to the second moving shaft 330, and thus the movement of the sling unit 300 may be induced even in a direction having a predetermined angle rather than in a horizontal direction.

As explained above, the smart sling 10 according to the present example embodiment may be driven to implement a two-way state even for a patient in a lying state, and may be driven to realize a moving state for a patient sitting in a wheelchair. Hereinafter, an example embodiment where the smart sling 10 is applied to the wheelchair will be explained.

Figure 4:
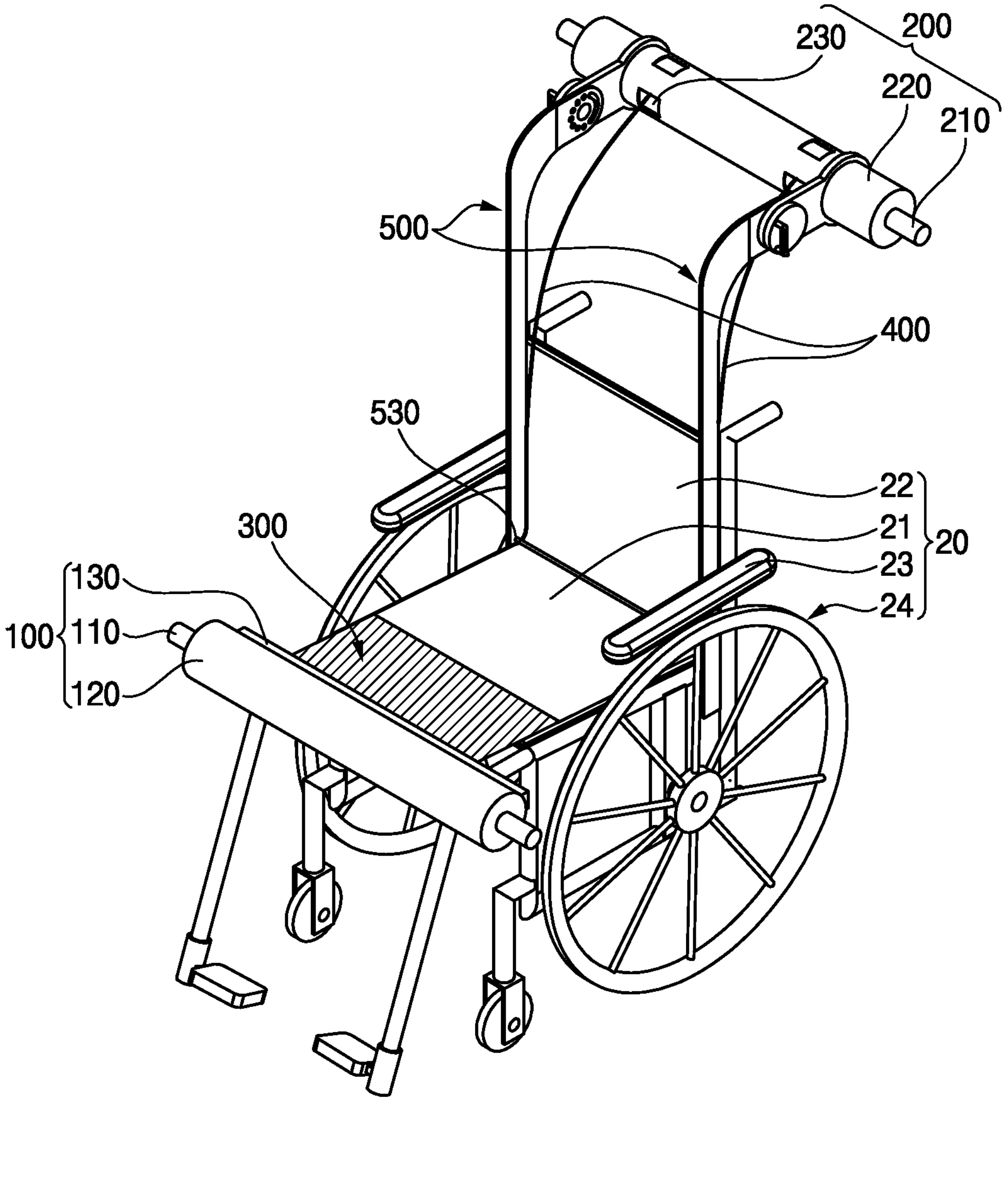
FIG. 4 is a perspective view illustrating a wheel chair having the smart sling of FIG. 1A.

FIG. 4 is a perspective view illustrating a wheel chair having the smart sling of FIG. 1A.

Referring to FIG. 4, the smart sling 10 according to the present example embodiment is applied to the wheelchair 20.

Here, the first driving unit 100 is disposed at a lower portion of the wheelchair 20, and the second driving unit 200 is disposed at an upper portion of the wheelchair 20.

A first entry and exit part 130 of the first driving unit 100 is positioned to head for a saddle 21 of the wheelchair 20, and thus the sling unit 300 is disposed at an end of the saddle 21.

The wire part 400 extends toward the second driving unit 200 from the first driving unit 100. For example, the wire part 400 extends parallel with the saddle 21, and then extends upwardly along a backrest 22.

Here, the wire part 400 is fixed by a guide shaft 530 explained below, and then a direction of the wire part 400 is changed.

As illustrated in FIG. 4, to fix the smart sling 10 to the wheel chair 20, a supporting unit 500 as an additional fixing structure is necessary, and then the supporting unit 500 is explained below.

Figure 5A:
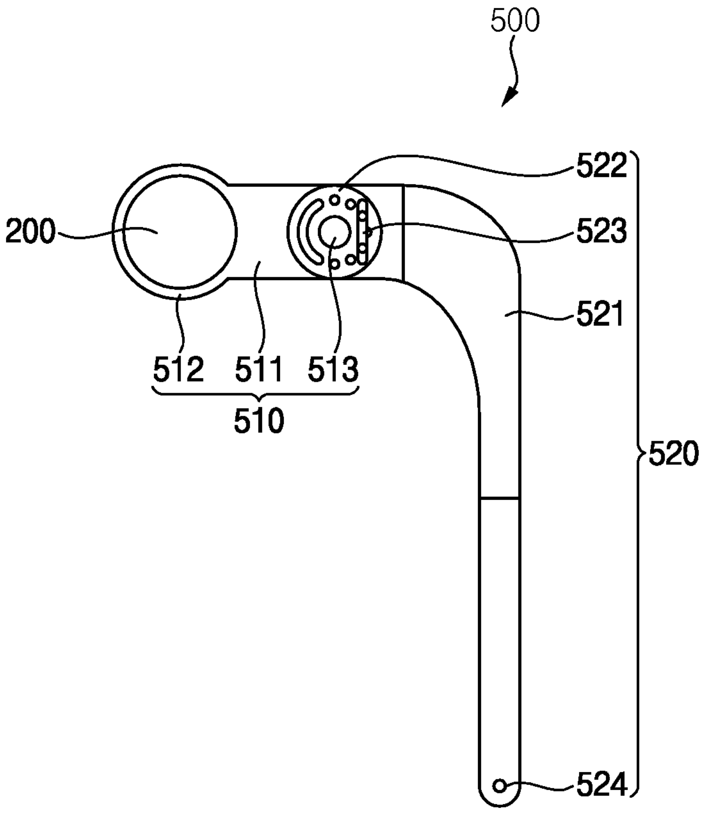
FIG. 5A, FIG. 5B and FIG. 5C are partial views of a supporting unit of FIG. 4.
Figure 5B:
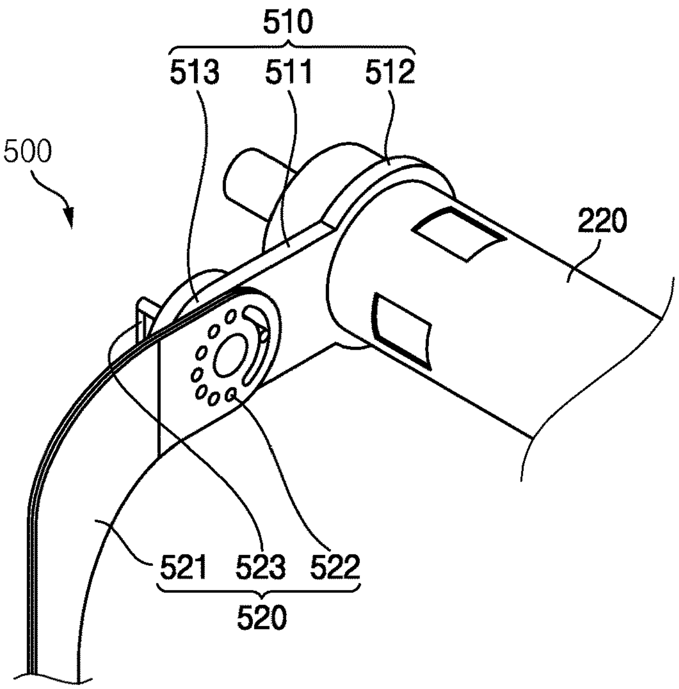
Figure 5C:
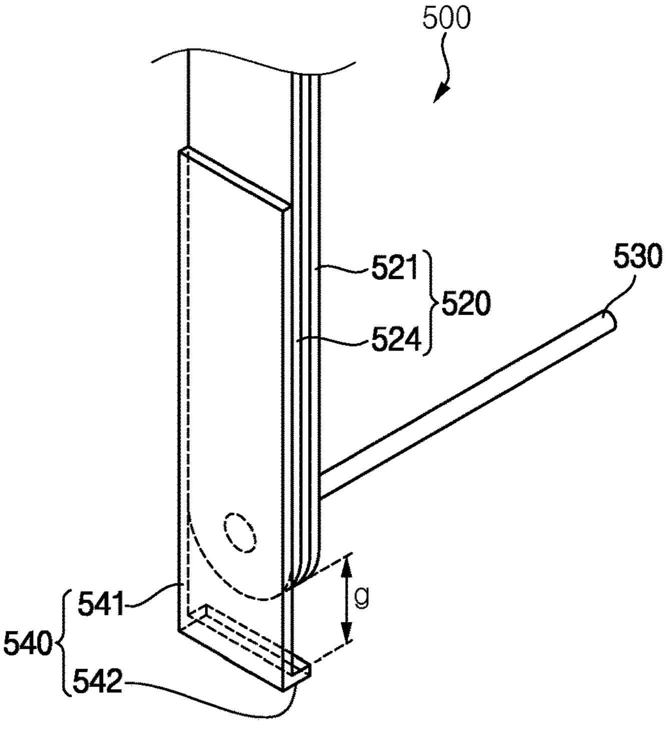

FIG. 5A, FIG. 5B and FIG. 5C are partial views of a supporting unit of FIG. 4.

Referring to FIG. 5A, FIG. 5B and FIG. 5C, the supporting unit 500 includes an upper unit 510, an extending unit 520, a guide shaft 530 and a lower unit 540.

A first side of the upper unit 510 is connected to the second driving unit 200, and a second side of the upper unit 520 is connected to the extending unit 520. The upper unit 510 includes an upper fixing part 512 connected to the second driving unit 200, an upper connecting part 513 connected to the extending unit 520, and an upper body 511 extending between the upper fixing part 512 and the upper connecting part 513.

A first side of the extending unit 520 is connected to the upper connecting part 513 of the upper unit 510, and a second side of the extending unit 520 is connected to the lower unit 540. The extending unit 520 includes a combining part 522 connected to the upper connecting part 513, a body part 521 extending from the combining part 522 and extending with a shape of 'L', and a lower fixing part 524 formed at a lower end of the body part 521.

Here, the extending unit 520 includes a combining member 523, and the combining member 523 fixes the upper connecting part 513 and the combining part 522 with each other. A plurality of holes is formed through the combining part 522 and the upper connecting part 513 with an arc shape, and the combining member 523 may be combined with any of the holes at an arbitrary position. Thus, a combining angle between the extending unit 520 and the upper unit 510 may be arbitrarily selected, and the position of the second driving unit 200 may be optimized at any wheelchair having various kinds of shapes or structures.

In FIG. 5A, it is illustrated that the supporting unit 500 extends with the 'L' shape and then the upper unit 510 and the extending unit 520 is combined with each other, but the combining direction may be changed variously and not limited thereto.

The body part 521 extends with the 'L' shape, and thus the second driving unit 200 disposed at the upper portion is capable of being combined with the saddle 21 of the wheelchair basically.

The lower unit 540 is combined at the lower fixing part 524.

The lower unit 540 includes a side portion 541 combined with the lower fixing part 524, and a lower portion 542 extending from the side portion 541 toward an inner direction. Here, a predetermined gap 'g' is formed between the side portion 541 and the lower portion 524, and the sling unit 300 passes through the gap.

The lower portion 542 is fixed at the saddle 21 of the wheelchair 20, and the gap forms a space between the saddle 21 and the guide shaft 530, and thus the sling part 350 of the sling unit 300 passes through the gap.

The guide shaft 530 extends from the lower fixing part 524, and the guide shaft 530 extends parallel with the saddle 21. In the present example embodiment, the supporting unit 500 is a pair, and the pair of supporting units 500 extends along a pair of handle parts 23 of the wheelchair 20.

Thus, the guide shaft 530 is connected between the pair of the lower fixing parts 524 which are the ends of the pair of the supporting units 500, and as explained above, a predetermined gap is formed between the guide shaft 530 and the saddle 21.

Figure 6:
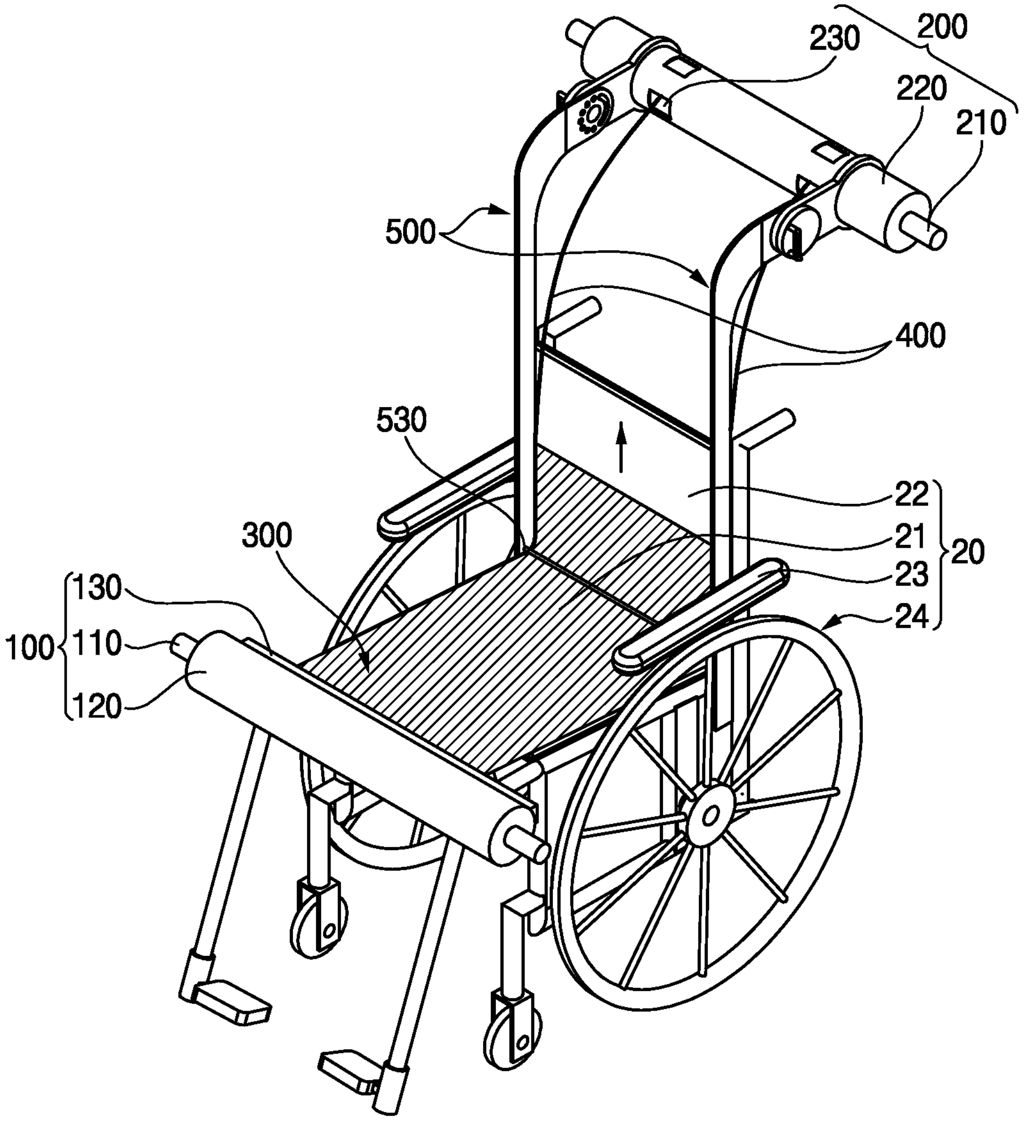
FIG. 6 is a perspective view illustrating an operation of the sling unit in the wheel chair of FIG. 4.

FIG. 6 is a perspective view illustrating an operation of the sling unit in the wheel chair of FIG. 4.

As explained above, at the initial state, the sling unit 300 wound in the first driving unit 100 is unfolded to the second driving unit 200 through the patient's buttocks and back, to transfer the patient sitting in the wheelchair.

However, the wheelchair 20 is positioned in a vertically bent state, and the direction in which the sling unit 300 is unfolded should be guided.

Thus, as explained above, the pair of the supporting units 500 are disposed between the wheelchair 20 and the second driving unit 200, and the direction of the sling unit 300 may be guided.

As illustrated in FIG. 6, the sling part 350 of the sling unit 300 is unfolded parallel with the saddle 21 from the first driving unit 100, and the sling part 350 passes through the gap between the guide shaft 530 and the saddle 21 with the direction of the sling part 350 being changed, and then the sling part 350 additionally extends upwardly.

Accordingly, the extending direction of the sling part 350 is changed vertically, and the sling part 350 is unfolded from the first driving unit 100 to the second driving unit 200. Then, the sling part 350 is located on the back as well as the hip of the patient, and then the transfer state for the patient is implemented.

Figure 7A:
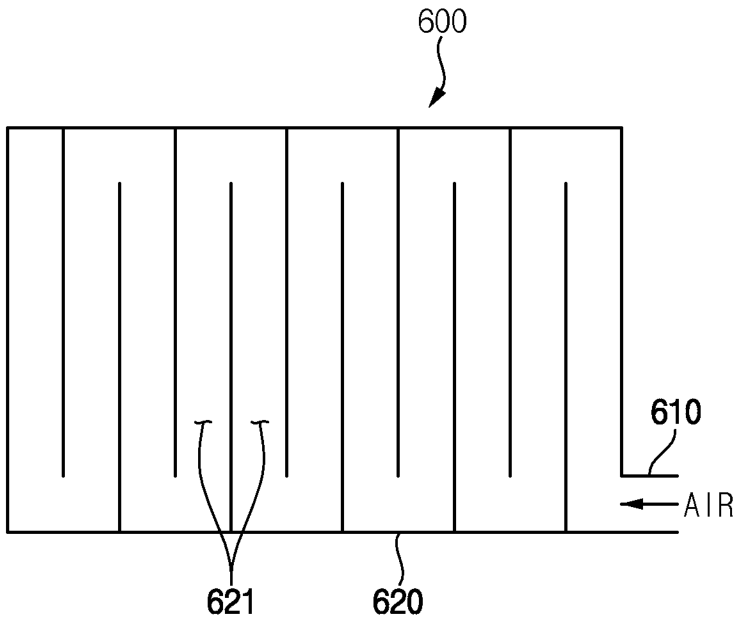
FIG. 7A is a plan view illustrating an air tube of the smart sling of FIG. 4.
Figure 7B:
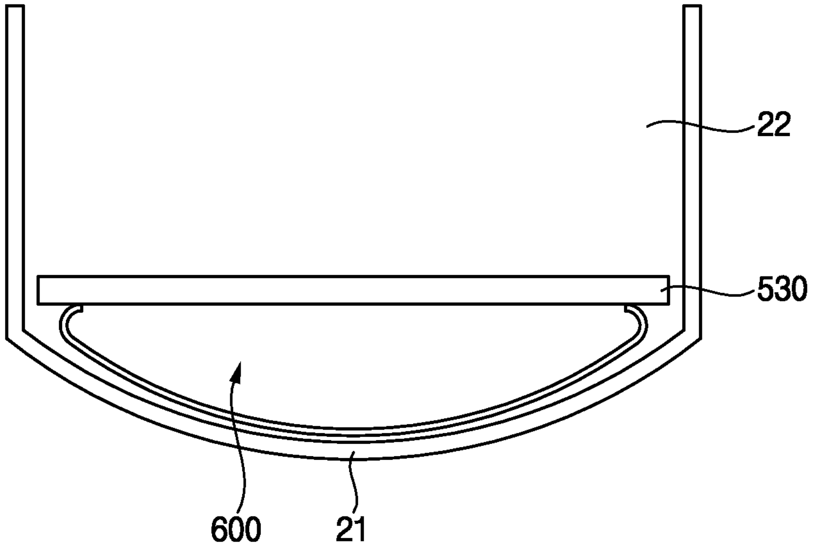
FIG. 7B is a side view illustrating an operation of the air tube of FIG. 7A.

FIG. 7A is a plan view illustrating an air tube of the smart sling of FIG. 4, and FIG. 7B is a side view illustrating an operation of the air tube of FIG. 7A.

Referring to FIG. 7A and FIG. 7B, the smart sling 10 according to the present example embodiment further includes an air tube 600 equipped to the saddle 21 additionally. Here, the air tube 600 may be equipped to the backrest 22 in addition to the saddle 21.

The air tube 600 includes an inlet 610 through which an air is provided, and a jacket 620 having a flow path 621 with a zigzag pattern inside of the jacket 620. Thus, the air provided through the inlet 610 expands the jacket 620 as illustrated in FIG. 7*b*. The patient may position his buttock on the saddle 21 in a more comfortable state, due to the expansion of the air tube 600.

According to the present example embodiment, in lifting or moving the patient, it is possible to assist the patient in transferring while maintaining the patient's lying position or sitting position in the wheelchair, and thus the time and effort in the transfer process may be decreased and the patient convenience may be increased.

Here, the expanding of the sling part is performed with, so called, a growth mechanism, and thus the stable mechanical actuation enables effective insertion into gaps between the patient and the bed or between the patient and the wheelchair.

In addition, in expanding the sling part, the position or the posture may be changed among the shafts, and thus excessive force applied to the shaft may be minimized in applying the sling part to the wheelchair.

Further, an additional supporting unit may be applied to assist the transfer even while sitting in the wheelchair, and the position of the sling part in the bent part between the saddle and the backrest may be effectively changed through the supporting unit, so that stable automation operation may be performed.

In addition, the air tube is applied to increase convenience of the patient.

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed.

What is claimed is:

1. A smart sling comprising:

a first driving unit configured to provide a rotational driving force;

a second driving unit spaced apart from the first driving unit by a predetermined distance, wherein the second driving unit comprises: a second driving motor configured to provide the rotational driving force; a second case configured to cover an outside of the second driving motor; and a second opening portion formed through the second case;

a wire part extending between the first driving unit and the second driving unit, wherein the wire part connected to the second driving motor passes through the second opening portion; and a sling unit configured to unfold toward the second driving unit from a folded state into the first driving unit along the wire part, to position a patient on the sling unit.

2. The smart sling of claim 1, wherein the first driving unit comprises:

a first driving motor configured to provide the rotational driving force;

a first case configured to cover an outside of the first driving motor; and a first entry and exit part extending to a side of the first case, to form a first opening portion.

3. The smart sling of claim 2, wherein the sling unit exits through the first entry and exit part, and moves toward the second driving unit.

4. The smart sling of claim 1, wherein the sling unit comprises:

a fixing shaft configured to rotate at a fixed position, wherein a sling part is wound on an outside of the fixing shaft;

a guide frame disposed adjacent to the fixing shaft, to guide an extending direction of the sling part;

a first moving shaft configured to spreading the sling part away from the fixing shaft; and a second moving shaft disposed adjacent to the first moving shaft.

5. The smart sling of claim 4, wherein the sling part comprises:

a first surface connected between the fixing shaft and the first moving shaft;

a second surface connected between the first moving shaft and the guide frame;

a third surface connected between the second moving shaft and the guide frame; and a fourth surface connected between the fixing shaft and the second moving shaft.

6. The smart sling of claim 5, wherein when the sling unit is unfolded, the first surface and the fourth surface are released from the fixing shaft and a length of the sling unit increases, as the first moving shaft and the second moving shaft move away from the fixing shaft.

7. The smart sling of claim 4, wherein the sling unit further comprises:

a switching shaft disposed adjacent to the second moving shaft, wherein a position of the switching shaft is changed so as to rotate with respect to the second moving shaft and the sling part does not wind along an outer surface of the switching shaft.

8. The smart sling of claim 1, wherein when the smart sling is equipped to a wheelchair, the first driving unit is disposed at a lower portion of the wheelchair, the second driving unit is disposed at an upper portion of the wheelchair, and the sling unit extends along a saddle and a backrest of the wheelchair from the first driving unit, to be unfold toward the second driving unit.

9. The smart sling of claim 8, further comprising:

a supporting unit configured to guide the unfold state of a sling part of the sling unit, wherein a first end of the supporting unit is fixed to the second driving unit, and a second end of the supporting unit is fixed to the saddle and the backrest.

10. The smart sling of claim 9, wherein the supporting unit comprises:

an upper unit fixed to the second driving unit;

an extending unit combined with the upper unit, and extending from the second driving unit toward a lower portion along the backrest; and a lower unit connected to a lower portion of the extending unit, to be fixed to the saddle.

11. The smart sling of claim 10, wherein the supporting unit is a pair, and further comprises a guide shaft, wherein both ends of the guide shaft are connected to the lower portions of a pair of the extending units, and the guide shaft extends parallel with the saddle to guide an extending direction of the sling part.

12. The smart sling of claim 10, wherein a predetermined gap is formed between a lower end of the extending unit and a lower portion of the lower unit.

13. The smart sling of claim 8, further comprising:

an air tube disposed on the saddle and inflated by receiving pneumatic pressure from outside.

* * * * *